(12) United States Patent
Engler et al.

(10) Patent No.: US 7,861,093 B2
(45) Date of Patent: Dec. 28, 2010

(54) MANAGING DATA ACCESS VIA A LOOP ONLY IF CHANGED LOCKING FACILITY

(75) Inventors: Eberhard Engler, Tuebingen (DE); Klaus Meissner, Herrenberg (DE); Ronald M. Smith, Sr., Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 1155 days.

(21) Appl. No.: 11/468,501

(22) Filed: Aug. 30, 2006

(65) Prior Publication Data
US 2008/0059808 A1  Mar. 6, 2008

(51) Int. Cl.
*G06F 11/30* (2006.01)
*G06F 12/14* (2006.01)

(52) U.S. Cl. .................... 713/189; 380/259; 380/37
(58) Field of Classification Search ................. 713/189; 380/259, 37
See application file for complete search history.

(56) References Cited

U.S. PATENT DOCUMENTS

| | | | | |
|---|---|---|---|---|
| 4,318,182 A * | 3/1982 | Bachman et al. | ............. | 718/105 |
| 5,175,852 A * | 12/1992 | Johnson et al. | ................. | 707/8 |
| 5,287,521 A * | 2/1994 | Nitta et al. | ................... | 710/200 |
| 5,394,545 A * | 2/1995 | Emrick et al. | ....................... | 1/1 |
| 5,488,721 A * | 1/1996 | Rich et al. | .............. | 707/103 R |
| 5,502,840 A * | 3/1996 | Barton | ........................ | 710/200 |
| 5,515,537 A * | 5/1996 | Tavares et al. | ............... | 710/244 |
| 5,535,365 A | 7/1996 | Barriuso et al. | ............. | 395/482 |
| 5,615,374 A * | 3/1997 | Sadoi et al. | .................. | 710/200 |
| 5,734,909 A * | 3/1998 | Bennett | ....................... | 710/200 |
| 5,835,766 A * | 11/1998 | Iba et al. | ..................... | 718/104 |
| 5,860,159 A | 1/1999 | Hagersten | ................... | 711/151 |
| 5,875,485 A * | 2/1999 | Matsumoto | .................. | 711/152 |
| 5,892,954 A * | 4/1999 | Tomas et al. | ................. | 710/200 |
| 5,930,794 A * | 7/1999 | Linenbach et al. | .......... | 707/100 |
| 5,983,225 A * | 11/1999 | Anfindsen | ....................... | 707/8 |
| 5,991,845 A * | 11/1999 | Bohannon et al. | ........... | 710/200 |
| 6,009,426 A * | 12/1999 | Jouenne et al. | ................. | 707/8 |
| 6,026,401 A * | 2/2000 | Brealey et al. | .................. | 707/8 |
| 6,078,982 A * | 6/2000 | Du et al. | ...................... | 710/200 |
| 6,148,300 A * | 11/2000 | Singhal et al. | .................. | 707/8 |
| 6,247,025 B1 * | 6/2001 | Bacon | ........................ | 707/206 |
| 6,314,563 B1 * | 11/2001 | Agesen et al. | .............. | 717/108 |
| 6,324,595 B1 * | 11/2001 | Tsai et al. | ...................... | 710/15 |
| 6,405,274 B1 * | 6/2002 | Chan | ........................... | 710/200 |
| 6,487,652 B1 * | 11/2002 | Gomes et al. | .................. | 712/23 |
| 6,496,909 B1 | 12/2002 | Schimmel | .................... | 711/163 |

(Continued)

OTHER PUBLICATIONS

Z/Architecture—Principles of Operation, SA22-7832-04, 5th Editiion, Sep. 2005.

*Primary Examiner*—David Garcia Cervetti
(74) *Attorney, Agent, or Firm*—John E. Campbell; Blanche E. Schiller, Esq.; Heslin Rothenberg Farley & Mesiti P.C.

(57) ABSTRACT

The management of data access is facilitated. A loop only if changed locking facility is provided, in which reads and updates of the data being managed are permitted, unless an update to the data completes during the execution of the read or update routine. As long as an update to the data has not completed during a processor's execution of the read or update routine, access is permitted.

20 Claims, 6 Drawing Sheets

SHARED MEMORY

U.S. PATENT DOCUMENTS

| | | | |
|---|---|---|---|
| 6,574,654 B1 * | 6/2003 | Simmons et al. | 718/104 |
| 6,578,033 B1 * | 6/2003 | Singhal et al. | 707/8 |
| 6,618,744 B1 * | 9/2003 | Simmons et al. | 718/104 |
| 6,651,123 B1 * | 11/2003 | Hutchison et al. | 710/200 |
| 6,678,772 B2 * | 1/2004 | McKenney | 710/200 |
| 6,704,767 B1 * | 3/2004 | Simmons et al. | 718/104 |
| 6,735,760 B1 * | 5/2004 | Dice | 717/139 |
| 6,952,736 B1 * | 10/2005 | Westbrook | 709/229 |
| 7,107,267 B2 * | 9/2006 | Taylor | 1/1 |
| 7,150,019 B1 * | 12/2006 | Simmons et al. | 718/104 |
| 7,222,142 B2 * | 5/2007 | Fischer et al. | 707/204 |
| 7,328,263 B1 * | 2/2008 | Sadjadi | 709/225 |
| 7,380,073 B2 * | 5/2008 | Shorb | 711/152 |
| 7,392,335 B2 * | 6/2008 | Chan et al. | 710/200 |
| 7,395,448 B2 | 7/2008 | Smith, Sr. et al. | |
| 7,406,476 B1 * | 7/2008 | Galloway et al. | 707/101 |
| 7,529,844 B2 * | 5/2009 | Radovic et al. | 709/229 |
| 2003/0145210 A1 * | 7/2003 | Taylor | 713/182 |
| 2003/0200213 A1 * | 10/2003 | Charlot et al. | 707/8 |
| 2005/0114609 A1 * | 5/2005 | Shorb | 711/152 |
| 2006/0129768 A1 * | 6/2006 | Pferdekaemper et al. | 711/161 |
| 2006/0149696 A1 * | 7/2006 | Pferdekaemper et al. | 707/1 |
| 2006/0149736 A1 * | 7/2006 | Pferdekaemper et al. | 707/9 |
| 2006/0155704 A1 * | 7/2006 | Fischer et al. | 707/8 |
| 2006/0242203 A1 * | 10/2006 | Pferdekaemper et al. | 707/200 |
| 2007/0079037 A1 * | 4/2007 | Scoredos | 710/200 |
| 2007/0192524 A1 * | 8/2007 | Chan et al. | 710/200 |
| 2007/0198792 A1 * | 8/2007 | Dice et al. | 711/163 |
| 2007/0198978 A1 * | 8/2007 | Dice et al. | 718/100 |

\* cited by examiner

MANAGING DATA ACCESS VIA A LOOP ONLY IF CHANGED LOCKING FACILITY

TECHNICAL FIELD

This invention relates, in general, to processing within processing environments, and in particular, to managing data access within the processing environments.

BACKGROUND OF THE INVENTION

To ensure the integrity of data within processing environments, locking techniques are employed that enable data access to be controlled. For example, locks are used to prevent one process from accessing the data being updated by another process.

Traditional locking techniques use a lock bit to control access to the data. When a process desires access, it tests the lock bit, and if it is set, the process loops waiting for the lock bit to be reset. This is true for data that is being read, as well as data being updated. Such a technique is referred to as loop while locked.

With loop while locked techniques, if the process performing an update is delayed, hangs up or stops, other processes waiting to read or update the information must loop. Thus, without special handling, referred to as lock recovery, a process may loop forever waiting for the lock bit to be turned off. This is a particularly serious problem for environments that require very frequent access to the data.

SUMMARY OF THE INVENTION

Based on the foregoing, a need exists for an enhanced locking capability. For example, a need exists for a locking capability that does not loop while locked, but instead, loops only if a change completes at a particular point in time (e.g., during the read or update routine requesting access to the data).

The shortcomings of the prior art are overcome and additional advantages are provided through the provision of a method of managing access to data of a processing environment. The method includes, for instance, using a value of a shared control block of the processing environment to identify a data block of a plurality of data blocks associated with the shared control block indicated as having current data; performing at least one operation to read or update the data of the identified data block; and determining, in response to performing the at least one operation, whether the value of the control block has changed, wherein the read or updated data is available for use, if the value has not changed.

System and computer program products corresponding to the above-summarized method are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

In accordance with an aspect of the present invention, a capability is provided for managing access to data of a processing environment. In particular, a locking capability is provided that does not prevent access to the data, unless an actual change to the data is completed during the time access to the data is requested. Instead of traditional locking approaches in which a lock bit is used and processes desiring access to the data test the lock bit and loop while it is locked waiting for the lock bit to be unlocked, a locking capability is provided herein in which there is no lock bit and looping only occurs when an actual update of the data is completed during the time access to the data is requested. This capability, referred to as the loop only if changed locking facility, includes a read routine and an update routine. A process executing the read or update routine only loops if an update actually completes by another process during execution of that read or update routine, and continues only as long as updates continue to complete. Thus, if a process performing an update is delayed, hangs up, stops or enters the check-stop state, no changes are occurring and the other processes in the environment continue to access the data.

Figure 1:
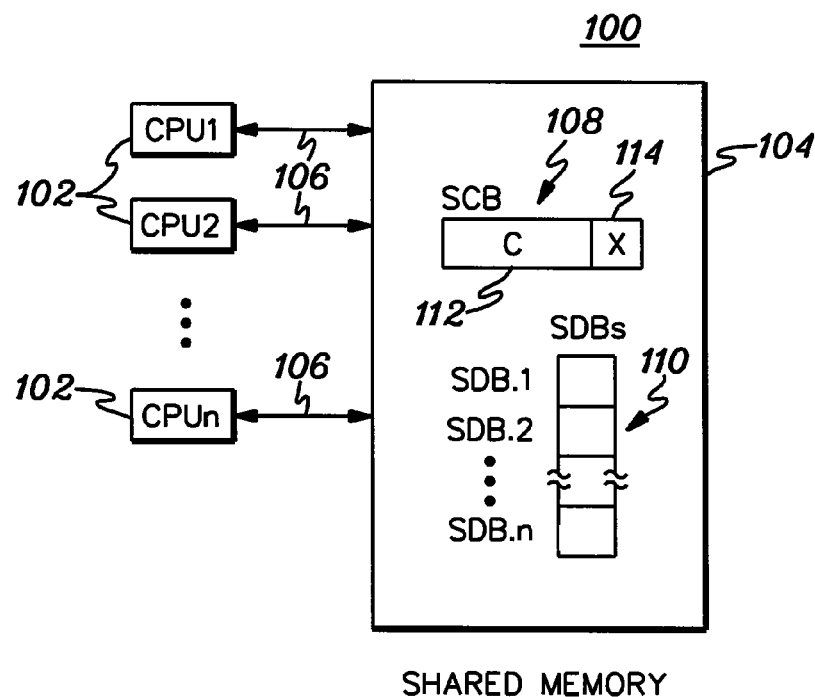
FIG. 1 depicts one embodiment of a processing environment incorporating and using one or more aspects of the present invention.

One example of a processing environment incorporating and using one or more aspects of the present invention is described with reference to FIG. 1. In this particular example, the processing environment is based on the z/Architecture, offered by International Business Machines Corporation, Armonk, N.Y., which is described in "z/Architecture—Principles of Operation", SA22-7932-04, 5$^{th}$Edition, September 2005, which is hereby incorporated herein by reference in its entirety.

A processing environment 100 includes, for instance, a plurality of central processing units 102 coupled to a shared memory 104 via one or more connections 106, e.g., one or more system buses. As an example, the central processing units and memory are components of a z/Series® server offered by International Business Machines Corporation (IBM®), Armonk, N.Y. IBM® and zSeries® are registered trademarks of International Business Machines Corporation, Armonk, N.Y., U.S.A. Other names used herein may be registered trademarks, trademarks or product names of International Business Machines Corporation or other companies.

Shared memory 104 includes a control block 108 used to manage access to data of one or more data blocks 110. As one example, control block 108 is a shared interface control block that includes two fields: a count field 112, which is a sequence count, and an index field 114 that points to one of the data blocks 110. In one example, the index points to a sanctioned data block (i.e., a data block that contains valid or current data).

More than one shared interface control block and associated data blocks may be maintained within shared memory. For instance, each function within the environment wishing to control access to data using the loop only if changed (LOC) locking facility would have a control block and associated data blocks to control access to data of that function.

There are many types of functions that can use the LOC facility. One type of function that benefits from using LOC is a function that is read intensive and updates less frequently. For instance, in the z/Architecture, there are various functions that fit this criteria including TOD (Time of Day) clock steering and other timing functions (e.g., the Perform Timing Facility Function described in U.S. Ser. No. 11/460,025, entitled "Directly Obtaining By Application Programs Information Usable In Determining Clock Accuracy," Smith Sr., et al., filed Jul. 26, 2006, which is hereby incorporated herein by reference in its entirety). Many other functions can also benefit from such a locking facility. Each one of these functions has its own control block and set of data blocks, in this embodiment.

Figure 2:
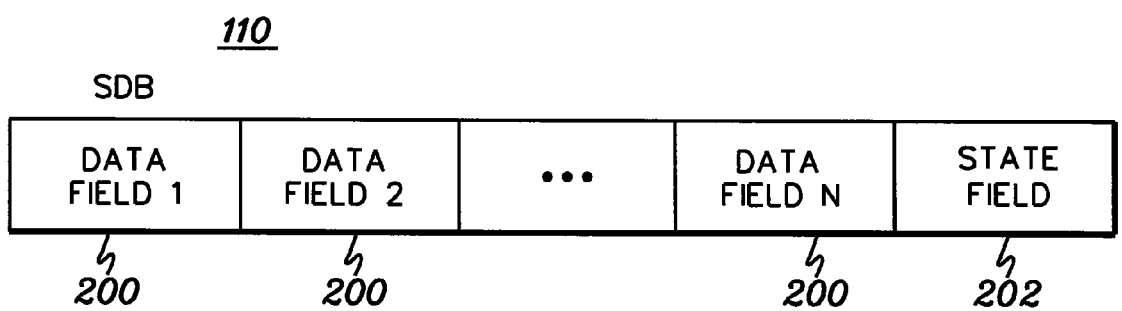
FIG. 2 depicts one embodiment of the fields associated with a data block maintained in shared memory of the processing environment of FIG. 1 and used in accordance with an aspect of the present invention.

Each of the data blocks 110, referred to herein as a shared interface data block (SDB), has one or more data fields 200 (FIG. 2) capable of storing shared information. In the example shown, data block 110 has N data fields 200. Each data field (assuming the block is not empty) includes data that is to be shared and depends on the type of function. For example, for the TOD clock steering function, the data fields include current start time, current base offset, TOD offset, and similar type of information. As a further example, for a banking function, the data fields may include name, address, date, time, and checking account balance. Again, the data fields can include any information to be shared by multiple processes and the actual data of the fields depend on the function. The choices are endless.

Shared interface data block 110 also includes a state field 202 representing the state of the data block. As examples, the state includes: empty—no data in the data block; draft—data is being placed in the data block; or sanctioned—data is valid or current in the data block. In this embodiment, there is only one sanctioned data block at a time. Most data blocks are in the empty state. A data block is in a draft state, while an update process is preparing it to become the sanctioned data block.

The data blocks and associated control block are used to manage access to the data of a valid or sanctioned data block without using a lock bit. Thus, a process is prevented from accessing the data, only if an update to the data is completed by another process during execution of the read or write routines by the process requesting access to the data. If an update is not completed during this time, access is granted without looping or waiting.

One embodiment of the logic associated with a read routine that employs the control block and shared data blocks to read desired data is described with reference to FIG. 3. In one embodiment, this logic is performed by the processor (e.g., a process therein) attempting access to the data. It can be performed in software; hardware, including millicode; and/or a combination thereof, as examples.

Figure 3:
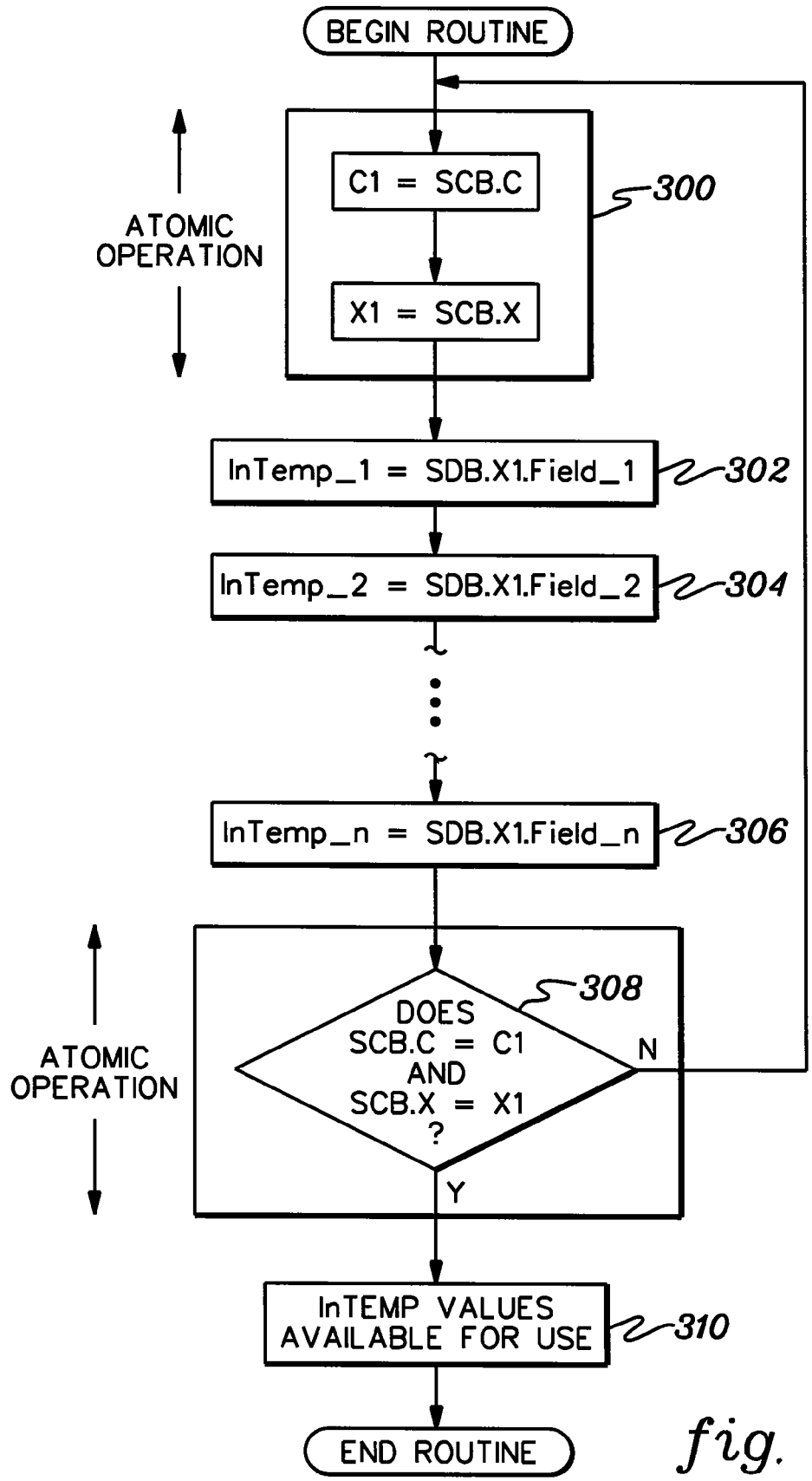
FIG. 3 depicts one embodiment of the logic associated with managing read access of data of the processing environment, in accordance with an aspect of the present invention.

Referring to FIG. 3, initially, the values of count and index are retrieved from the control block and stored in variables, C1 and X1, respectively, STEP 300. This is an atomic operation. That is, all accesses to the control block appear to be concurrent, as observed by other processors.

Thereafter, the data in the data fields (and optionally the state field) of the data block pointed to by the index are stored in temporary buffers. For example, field 1 of the data block pointed to by index X1 (i.e., SDB.X1.Field_1) is stored in InTemp_1, STEP 302. Similarly, if other fields exist, SDB.X1.Field_2 is stored InTemp_2, STEP 304, and so forth, for the remaining data fields of the data block, STEP 306.

As an example, assume the function requesting read access is a checking account application and the data to be read is checking account information. In this particular example, SDB.X1.Fields_1-5 include name, address, date, time and account balance. Thus, InTemp_1=name, InTemp_2=address, InTemp_3=date, InTemp_4=time, and InTemp_5=balance. The actual values for these fields are placed in the temporary buffers.

Subsequent to storing the data of the sanctioned data block in the temporary buffers, a determination is made as to whether the values of the shared control block have changed, INQUIRY 308. That is, a determination is made as to whether the count field of the control block is still equal to C1 and whether the index field of the control block is still equal to X1. This is performed as an atomic operation. If the values have not changed, then the data stored in the InTemp buffers are available for use, STEP 310. This data is the desired data read from the data blocks. However, if one or more of the values have changed, then another process has completed an update of the sanctioned data block during execution of the read routine by this process, so this process loops until the values have no longer changed. That is, the process executing the read routine loops while changes by other processes complete during this routine. When no more changes are completed during this routine, as indicated by the count and index values being the same at the beginning and end of the routine, the data is read and available for use.

In addition to a read routine, an update routine is provided to write to and/or update a data block. One embodiment of the logic associated with using the control block and data blocks in an update routine are described with reference to FIGS. 4a-4c. Again, as one embodiment, this logic is performed by the processor (e.g., a process therein) attempting access to the data. It can be performed in software; hardware, including millicode; and/or a combination thereof, as examples.

Figure 4A:
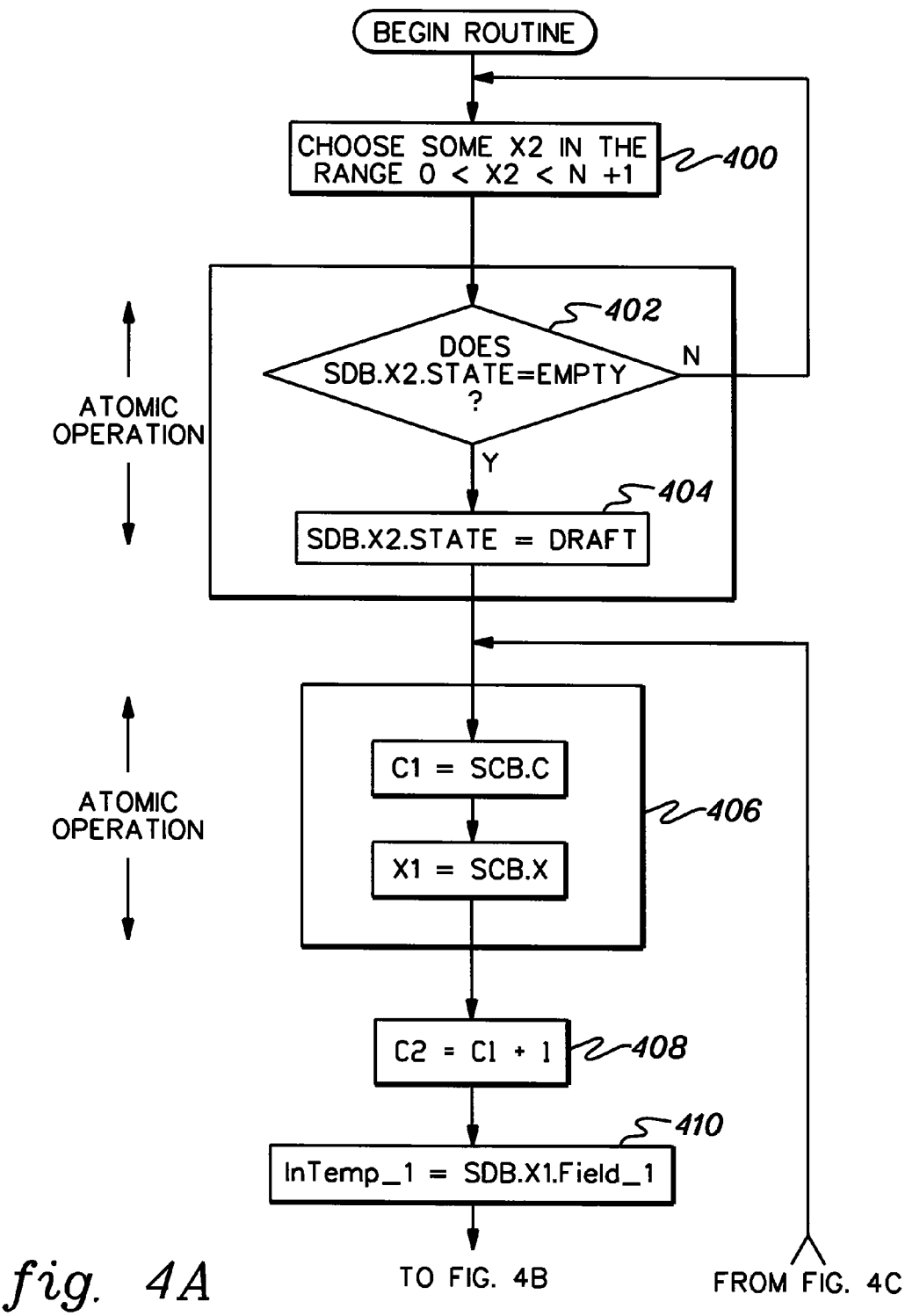
FIGS. 4a-4c depict one embodiment of the logic associated with managing write access to the data of the processing environment, in accordance with an aspect of the present invention.
Figure 4B:
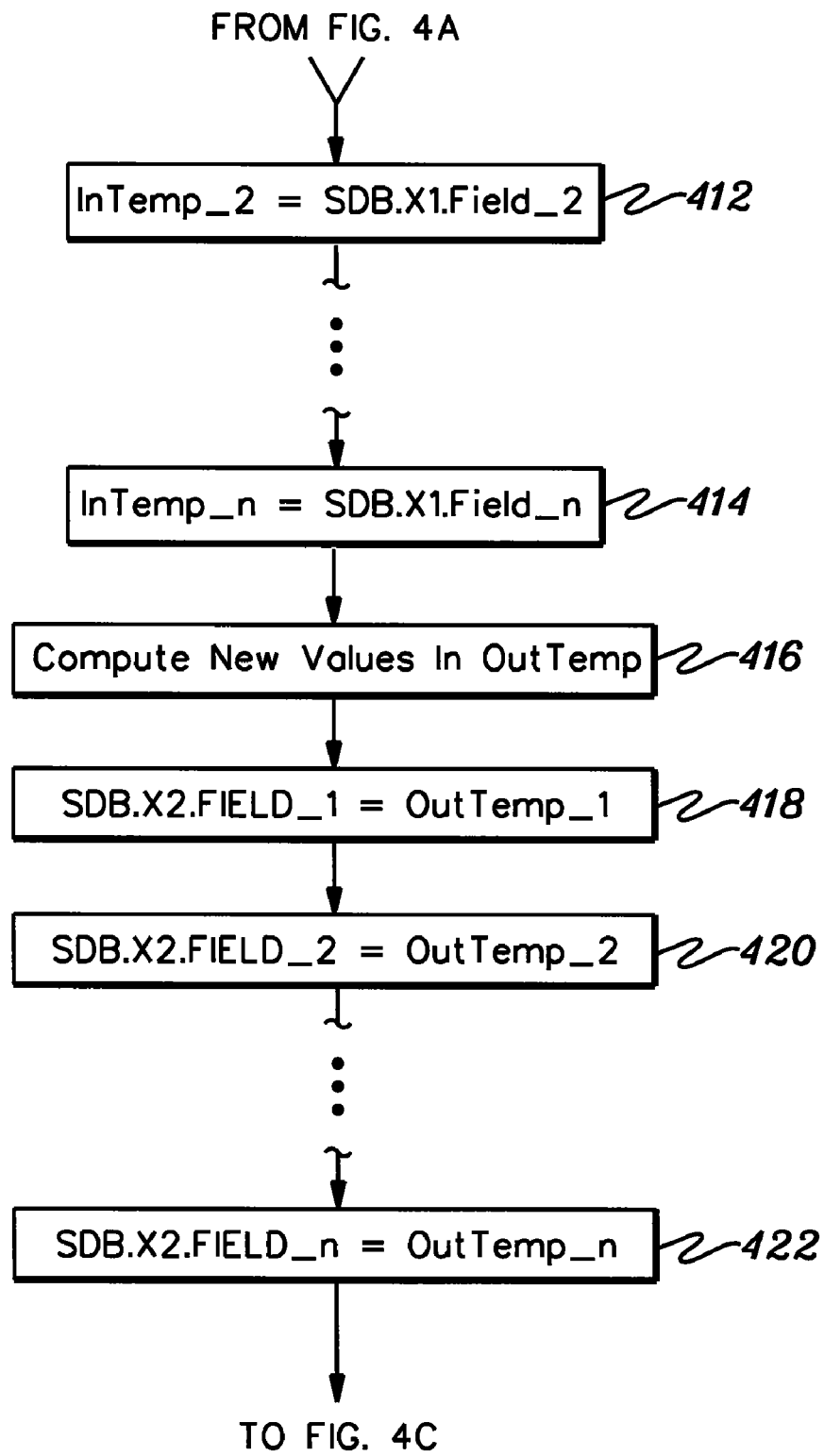

Referring to FIG. 4a, initially, a value for a variable X2 is chosen, STEP 400. In one example, a value is selected between the values of zero and N+1, wherein N is the number of data blocks. A determination is then made as to whether the state of the data block indicated by the X2 pointer is empty, INQUIRY 402. If not, then processing continues with STEP 400 until an empty data block is found. However, if the state of the chosen data block is empty, then the state of that block is set to draft, STEP 404. The determination of the state of the block and the setting of the state to draft are performed as an atomic operation.

Thereafter, a further atomic operation is performed in which the value of C1 is set equal to the count value of the control block and X1 is set equal to the index value, STEP 406. Further, a variable C2 is set equal to C1+1, STEP 408.

Next, the data fields of the data block pointed to by index X1 are read and placed in temporary buffers. For instance, SDB.X1.Field_1 is stored in InTemp_1, STEP 410, SDB.X1.Field_2 is stored in InTemp_2, STEP 412 (FIG. 4b), and so forth, STEP 414. Obviously, STEPs 412-414 are only performed if the data block includes more than one data field. (This is also true for STEPs 304-306 of FIG. 3.) Thus, taking the checking account application as an example, in response to performing STEPs 410-414, InTemp_1=name, InTemp_2=address, InTemp_3=date, InTemp_4=time, and InTemp_5=account balance (e.g., $200.00).

Subsequently, updated values are determined and placed in temporary buffers, referred to herein as OutTemp, STEP 416. For instance, assume name and address of the checking account example remain the same, but date and time change to reflect the current date and time of this update, and $200 is added to the account balance. In this particular example, OutTemp_1=name, OutTemp_2=address, OutTemp_3=current date, OutTemp_4=current time, and OutTemp_5=$400.

Then, the data of the temporary buffers are stored in the empty data block chosen earlier in the routine and set to draft (i.e., the data block pointed to by X2). Thus, SDB.X2.Field_1=OutTemp_1, STEP 418; SDB.X2.Field_2=OutTemp_2, STEP 420; and SDB.X2.Field_n=OutTemp_n, STEP 422 (again, assuming more than 1 data field).

Figure 4C:
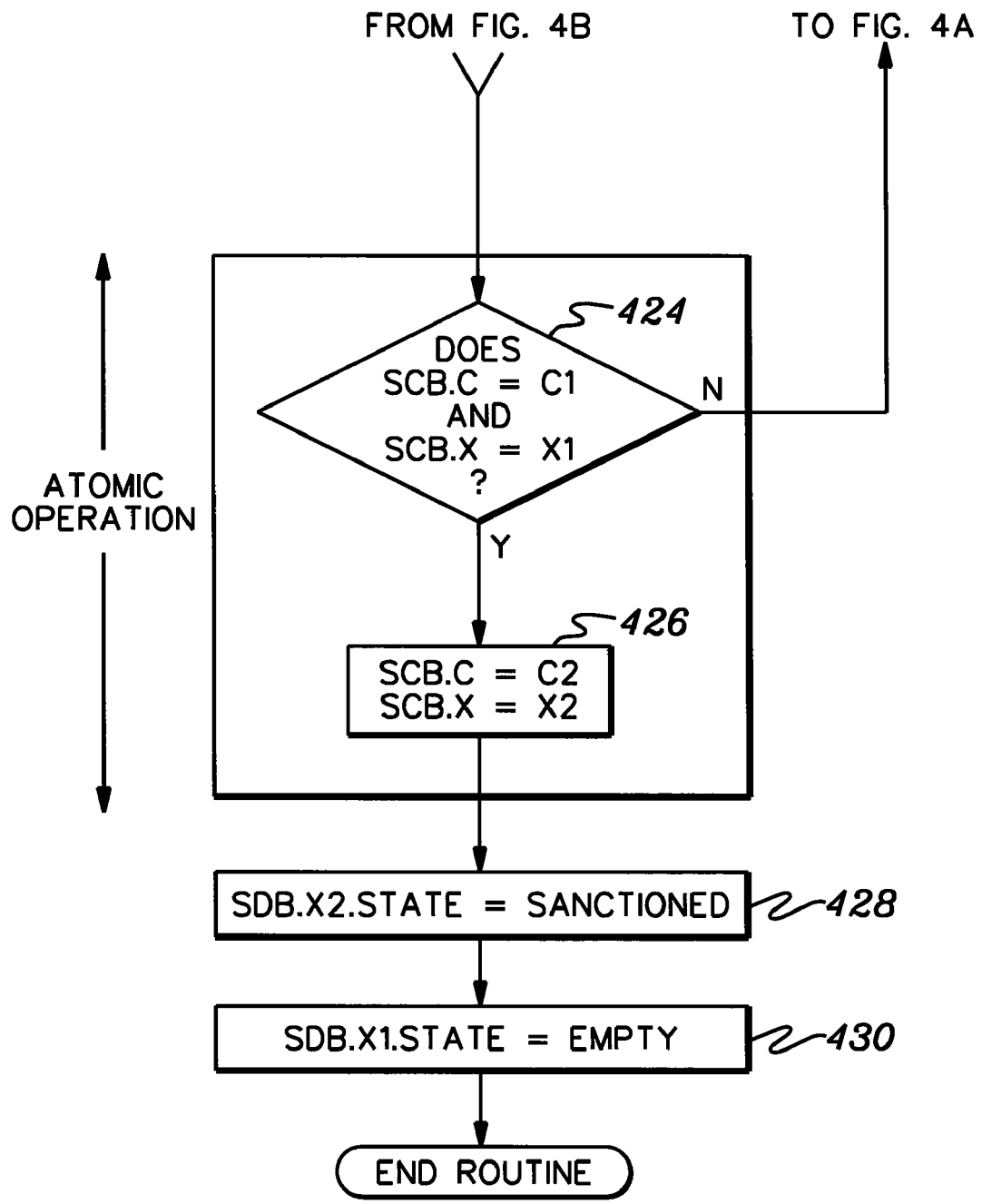

After updating the draft SDB, a determination is made as to whether the count and index values of the control block have changed, INQUIRY 424 (FIG. 4c). If the values have changed, then processing continues with STEP 406 (FIG. 4a). That is, the process loops, since another process completed a change to the sanctioned data block, while this process was executing this update routine. Otherwise, processing continues with setting the control block count equal to C2 and the control block index equal to X2, STEP 426. The determination and the setting of the count and index fields are an atomic operation.

Assuming the atomic operation is successful, the state of the data block pointed to by X2 is set to sanctioned, STEP 428, and the state of the previously sanctioned SDB pointed to by X1 is set to empty. This concludes the update routine.

Described in detail above is an efficient loop only if changed locking facility that requires a process to loop only if an update actually completes (by another process), while the process is executing the read or update routine. Looping continues only as long as updates continue to complete. If an update does not complete during execution of the routine, the process does not loop and is able to access the data.

This facility can be used with any type of function or service that desires to manage access to shared data. Although the checking account example is described above, that is only one example. Many other functions may similarly use one or more concepts of the present invention.

For example, in another embodiment, the Time of Day (TOD) clock steering facility of the z/Architecture provided by International Business Machines Corporation uses a control block and associated data blocks to manage access to Time of Day clock steering data. In this particular example, the fields of a sanctioned data block include, for instance, the following: old-episode start time, old-episode base offset, old-episode fine steering rate, old-episode gross steering rate, new-episode start time, new-episode base offset, new-episode fine steering rate, new-episode gross steering rate, current start time, current base offset, current fine steering rate, current gross steering rate, current total steering rate, and time of day offset. These variables are described further in the above-referenced "z/Architecture—Principles of Operation."

One or more of these fields are read and/or updated by the hardware (e.g., millicode) of the machine. Thus, the machine uses, in accordance with an aspect of the present invention, the read and/or update routine described herein. This is particularly useful since the reading of this data occurs simultaneously on each CPU in the processing environment every 1,024 microseconds, but is updated not more than 16 times a second. Due to the read intensive nature of this facility, the locking of a lock bit by each CPU to obtain the information would be prohibitive.

As a further example, the locking facility of the present invention that employs a control block and data block is usable by a Perform Timing Facility Function of the z/Architecture. In this particular case, the fields of a sanctioned data block include the following:

a) System Timing Mode—This field indicates the timing mode of the system. Valid timing modes for IBM's z/Architecture include, for instance, local timing mode, ETR (External Time Reference) timing mode, STP timing mode.

b) System Timing State—This field indicates the timing state of the system. Examples of timing state include unsynchronized and synchronized.

c) Maximum Skew Rate—This field includes a value indicating the absolute value of the unknown skew rate of the physical clock. This value has a resolution of, for instance, one part per $2^{44}$. The maximum skew rate field is valid when it is non-zero.

d) Leap Seconds Update Event Time—This field includes a value indicating the primary reference time (PRT) at which the new leap seconds value takes effect. The new leap seconds field is valid when, for instance, this field is non-zero. As is known, primary reference time is a standardized time provided by a chosen clock located, for instance, in Fort Collins, Colo. (or in other designated locations). It is a clock separate from the TOD clock, and used as a reference clock (e.g., to set other clocks, determine accuracy of other clocks, etc.).

e) Old Leap Seconds—This field includes a value indicating the number of leap seconds in effect prior to the leap seconds update event. Thus, when the leap seconds update event time is non-zero, the old leap seconds value is in effect for a primary reference time less than the leap seconds update event time. When the leap seconds update event time is zero, the old leap seconds value is currently in effect and no change has been scheduled. The value is provided in seconds with the low order bit equaling one second, as one example.

f) New Leap Seconds—This field includes a value indicating the number of leap seconds in effect for a primary reference time equal to or greater than the leap seconds update event time. The value is provided in seconds with the low order bit equaling one second, as one example. The new leap seconds field is valid when the leap seconds update event time is non-zero.

g) PRT Update Event Time—This field includes a value indicating the value of CST (coordinated server time (Tq)) at the most recent time that the PRT parameters (e.g., PRT CST dispersion, PRT CST offset, PRT correction start time, and estimated PRT correction duration) were updated. The PRT update event time field is valid when it is non-zero.

h) PRT CST Dispersion—This field includes a value indicating the PRT CST dispersion computed at the most recent PRT update event. This value is, for instance, in clock units, and as such, a specified bit of the field (e.g., bit 63) has a resolution equal to a corresponding specified bit of the time of day clock.

i) PRT CST Offset—This field includes a value indicating the PRT CST offset computed at the most recent PRT update event. The value is, for instance, in clock units, and as such, a specified bit (e.g., bit 63) has a resolution equal to a corresponding specified bit of the time of day clock. The PRT CST offset added to coordinated server time (CST), ignoring a carry, if any, out of a specified bit (e.g., bit zero), forms primary reference time (PRT).

j) PRT Correction Start Time—This field includes a value indicating the time at which the PRT correction steering is initiated.
k) Estimated PRT Correction Duration—This field includes a value indicating the estimated length of time required to steer out the PRT CST offset. The value is, for instance, in clock units, and as such, a specified bit (e.g., bit 63) has a resolution equal to a corresponding specified bit of the TOD clock.
l) CST Update Event Time—This field includes a value indicating the value of the basic machine TOD clock (Tb) at the most recent time that the CST parameters (e.g., CST TOD dispersion and CST TOD offset) were updated.
m) CST TOD Dispersion—This field includes a value indicating the CST TOD dispersion computed at the most recent CST update event. This value is, for instance, in clock units, and as such, a specified bit of this value (e.g., bit 63) has a resolution equal to a corresponding specified bit of the time of day clock.
n) CST TOD Offset—This field includes a value indicating the CST TOD offset computed at the most recent CST update event. This value is, for instance, in clock units, and as such, a specified bit of this field (e.g., bit 63) has a resolution equal to a corresponding specified bit of the time of day clock. The CST TOD offset added to the basic machine time of day clock, ignoring a carry, if any, out of a defined bit (e.g., bit 0), forms coordinated server time.

Like the Time of Day steering facility, for the Perform Timing Facility Function, the millicode of the machine updates the information of the sanctioned data block using the update routine described herein. Further, the read routine described herein is used to read the sanctioned information.

Although various examples have been provided herein, these are only examples. Examples of the types of functions, services, etc. that can benefit from one or more aspects of the present invention are endless. These examples are only given to help facilitate an understanding of the invention. Further, although in the timing examples, the millicode updates the data blocks, in other examples, like the banking example and numerous others, the application software updates the data blocks.

One or more aspects of the present invention can be included in an article of manufacture (e.g., one or more computer program products) having, for instance, computer useable media. The media has therein, for instance, computer readable program code means of logic (e.g., instructions, code, commands, etc.) to provide and facilitate the capabilities of the present invention. The article of manufacture can be included as a part of a computer system or sold separately.

Figure 5:
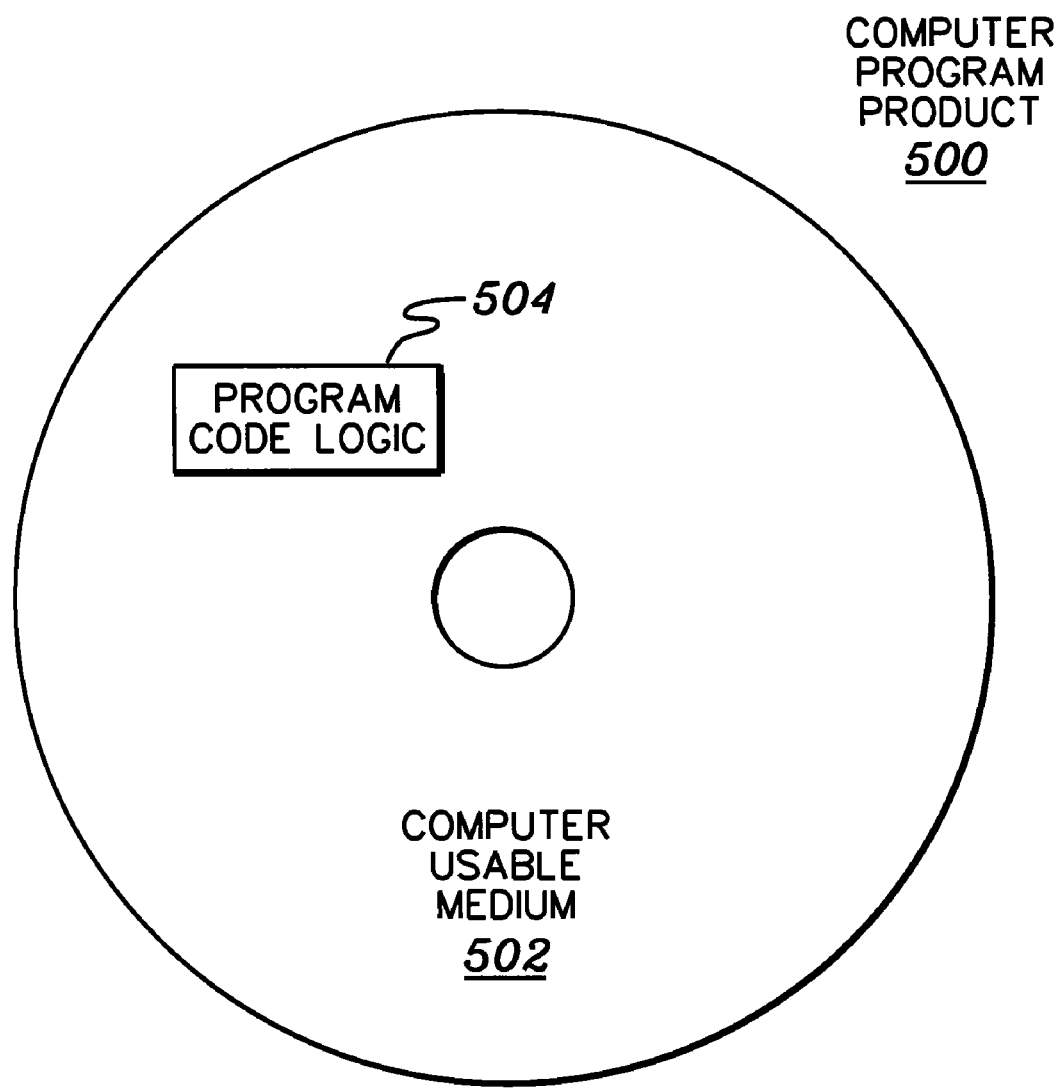
FIG. 5 depicts one embodiment of a computer program product incorporating one or more aspects of the present invention.

One example of an article of manufacture or a computer program product incorporating one or more aspects of the present invention is described with reference to FIG. 5. A computer program product 500 includes, for instance, one or more computer usable media 502 to store computer readable program code means or logic 504 thereon to provide and facilitate one or more aspects of the present invention. The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

Advantageously, a locking facility is provided in which the routine (read or update) loops only if a change to the data block completes, while the routine is executing. If the process performing an update is delayed, hangs up, stops or enters the check-stop state, no changes are occurring or completing and the other processes in the system can continue. This loop only if changed locking facility loops only if an update actually completes during the execution of the routine, and looping continues only as long as updates continue to complete. Since the critical portion of the update in the update routine is performed as a compare and swap interlocked update, lock recovery is avoided, at least in the critical path. In the rare event that multiple updates are attempted concurrently, multiple data blocks are in the draft state, but only one of these updates is completed successfully. The other update routines are notified that the sanctioning process was not successful.

Although various embodiments are described above, these are only examples. One or more variations can be made without departing from the spirit of the present invention. For instance, the processing environment may include more or less than the number of CPUs shown in FIG. 1. Further, processing environments based on architectures other than the z/Architecture can include one or more aspects of the present invention. Additionally, the central processing units and memory may be components of processing units other than z/Series® servers. One or more aspects of the present invention can be employed in a single processor environment or a multiple processor environment.

Further, although various fields and parameters are described, many variations are possible. Again, although various embodiments are described herein, these are not meant to limit the scope of the present invention. Many variations may be made without departing from the spirit of the present invention.

As a further embodiment, an environment may include an emulator (e.g., software or other emulation mechanisms), in which a particular architecture or subset thereof is emulated. In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the instruction fetch unit and to determine the type of instructions that have been fetched; and an instruction execution unit to execute the instructions. Execution may include loading data into a register for memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

Although preferred embodiments have been depicted and described in detail there, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of managing access to data of a processing environment, said method comprising:
   using, by a process executing on one or more processors of the processing environment, a value of a shared control block of the processing environment to identify a data block associated with the shared control block and indicated as having current data, the data block comprising data to which access is managed via the shared control block;
   performing, by the process, at least one operation to read or update the data of the identified data block; and
   determining, by the process, in response to performing the at least one operation, whether the value of the shared control block has changed, wherein the read or updated data is available for use if the value has not changed.

2. The method of claim 1, wherein the using, performing and determining are repeated, if the value has changed, and the read or updated data is unavailable for use.

3. The method of claim 1, wherein the changed value indicates that an update of the data has completed, since retrieval of the value from the control block.

4. The method of claim 1, wherein a changed value indicates that an update to the data completed by another process during execution of the routine.

5. The method of claim 1, wherein the control block comprises another value, and wherein the determining comprises determining whether one or more of the value and the another value have changed, wherein a change to either value indicates the data is not usable.

6. The method of claim 5, wherein the one value is an index value used to select the data block having current data and the another value is a count.

7. The method of claim 1, wherein the identified data block comprises one or more data fields having shared data and a state field indicating a state of the data block.

8. The method of claim 1, wherein the performing comprises reading data from one or more data fields of the identified data block into one or more temporary buffers, wherein the read data in the one or more temporary buffers is available for use, if the determining indicates the value has not changed.

9. The method of claim 1, wherein the performing comprises reading data from one or more data fields of the identified data block into one or more temporary buffers, wherein the read data in the one or more temporary buffers is unavailable for use, if the determining indicates the value has changed, and further comprising repeating the using, performing and determining.

10. The method of claim 1, wherein the performing comprises:
    selecting a data block of the plurality of data blocks that is empty;
    reading data from one or more data fields of the identified data block into one or more temporary buffers;
    choosing one or more data values for the one or more data fields, wherein the data of at least one data field of the one or more data fields is updated;
    storing the one or more chosen data values in one or more data fields of the selected data block; and
    providing the selected data block as the new current data block, if the determining indicates that the value has not changed.

11. The method of claim 10, further comprising updating a state of the selected data block to sanctioned and a state of the identified data block to empty, if the determining indicates that the value has not changed.

12. The method of claim 1, wherein the performing comprises:
    selecting a data block of the plurality of data blocks that is empty;
    reading data from one or more data fields of the identified data block into one or more temporary buffers;
    choosing one or more data values for the one or more data fields, wherein the data of at least one data field of the one or more data fields is updated;
    storing the one or more chosen data values in one or more data fields of the selected data block; and
    repeating the selecting, reading, choosing and storing, in response to the determining indicating the value has changed, wherein the data of the selected data block is unavailable for use.

13. The method of claim 12, wherein the data of the identified data block remains available for use.

14. A system of managing access to data of a processing environment, said system comprising:
    one or more processors configured to perform a method, the method comprising:
    using, by a process executing on the one or more processors of the processing environment, a value of a shared control block of the processing environment to identify a data block associated with the shared control block and indicated as having current data, the data block comprising data to which access is being managed via the shared control block;
    performing, by the process, at least one operation to read or update the data of the identified data block; and
    determining, by the process, in response to performing the at least one operation, whether the value of the shared control block has changed, wherein the read or updated data is available for use if the value has not changed.

15. The system of claim 14, wherein a changed value indicates that an update to the data completed by another process during execution of the routine.

16. The system of claim 14, wherein in performing the at least one operation, the processor is adapted to:
select a data block of the plurality of data blocks that is empty;
read data from one or more data fields of the identified data block into one or more temporary buffers;
choose one or more data values for the one or more data fields, wherein the data of at least one data field of the one or more data fields is updated;
store the one or more chosen data values in one or more data fields of the selected data block; and
provide the selected data block as the new current data block, if the determining indicates that the value has not changed.

17. A computer program product for managing access to data of a processing environment, the computer program product comprising:
a non-transitory storage medium readable by a processor and storing executable instructions for execution by the processor to perform a method comprising:
using, by a process executing on one or more processors of the processing environment, a value of a shared control block of the processing environment to identify a data block associated with the shared control block and indicated as having current data, the data block comprising data to which access is being managed via the shared control block;
performing, by the process, at least one operation to read or update the data of the identified data block; and
determining, by the process, in response to performing the at least one operation, whether the value of the shared control block has changed, wherein the read or updated data is available for use if the value has not changed.

18. The computer program product of claim 17, wherein the using, performing and determining are repeated, if the value has changed, and the read or updated data is unavailable for use.

19. The computer program product of claim 17, wherein the method further comprises:
selecting a data block of the plurality of data blocks that is empty;
reading data from one or more data fields of the identified data block into one or more temporary buffers;
choosing one or more data values for the one or more data fields, wherein the data of at least one data field of the one or more data fields is updated;
storing the one or more chosen data values in one or more data fields of the selected data block; and
providing the selected data block as the new current data block, if the determining indicates that the value has not changed.

20. The computer program product of claim 17, wherein the method further comprises:
selecting a data block of the plurality of data blocks that is empty;
reading data from one or more data fields of the identified data block into one or more temporary buffers;
choosing one or more data values for the one or more data fields, wherein the data of at least one data field of the one or more data fields is updated;
storing the one or more chosen data values in one or more data fields of the selected data block; and
repeating the selecting, reading, choosing and storing, in response to the determining indicating the value has changed, wherein the data of the selected data block is unavailable for use.

* * * * *